J. L. ROOP.
MOVING PICTURE CAMERA AND PROJECTING DEVICE.
APPLICATION FILED MAR. 24, 1913.

1,133,580.

Patented Mar. 30, 1915.

3 SHEETS—SHEET 1.

WITNESSES:
D. B. Galt.
H. S. Austin.

INVENTOR
Joseph L. Roop.

BY
Joshua R. H. Potts
ATTORNEY

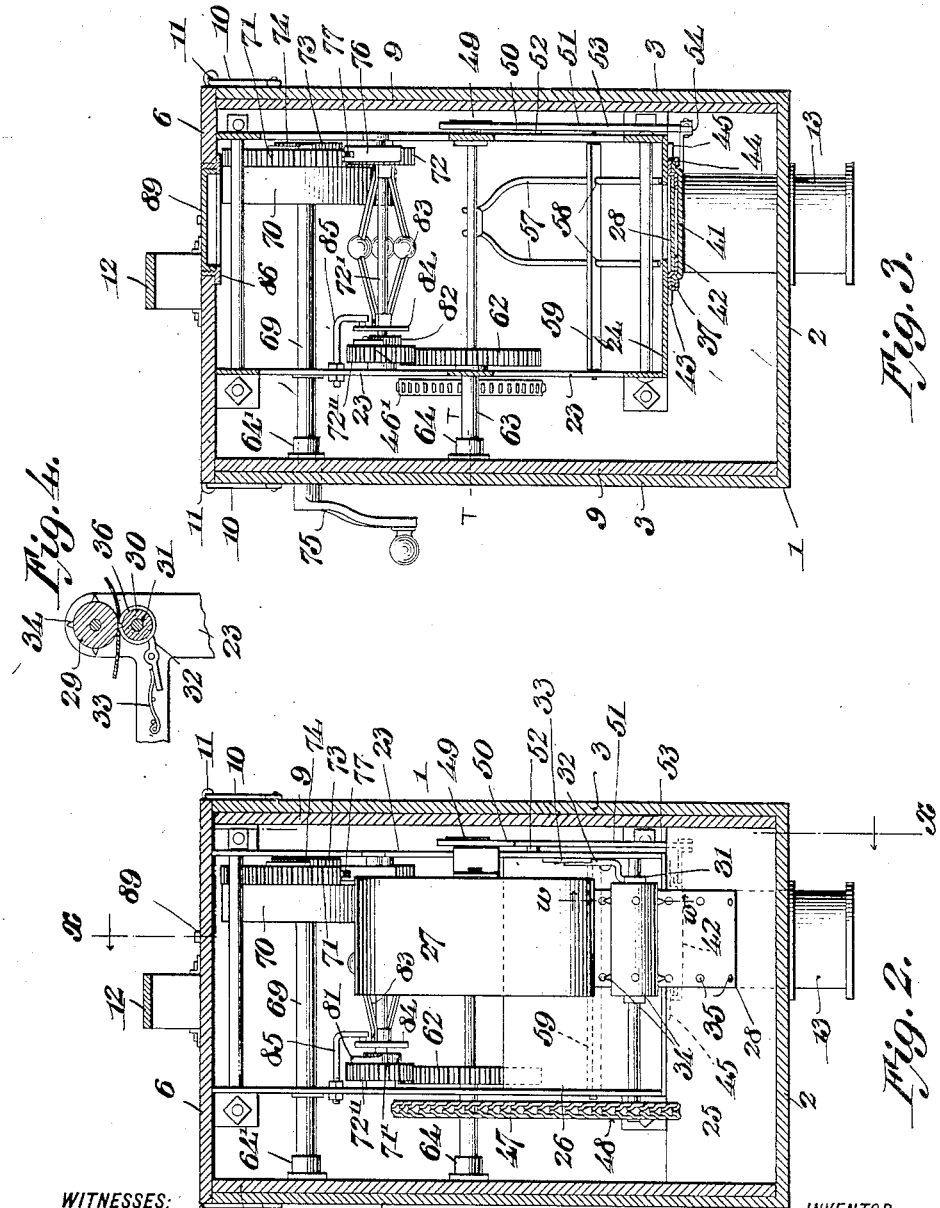

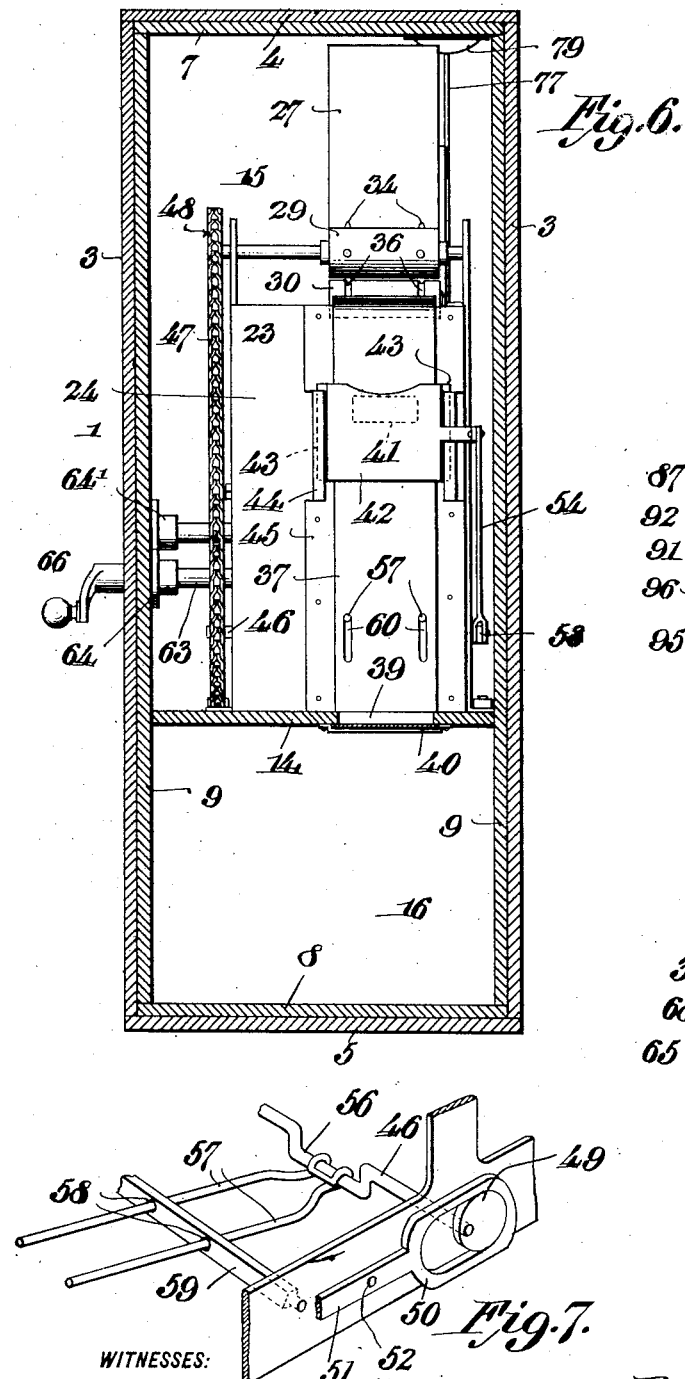

UNITED STATES PATENT OFFICE.

JOSEPH L. ROOP, OF LOUISVILLE, KENTUCKY.

MOVING-PICTURE CAMERA AND PROJECTING DEVICE.

1,133,580. Specification of Letters Patent. Patented Mar. 30, 1915.

Application filed March 24, 1913. Serial No. 756,400.

*To all whom it may concern:*

Be it known that I, JOSEPH L. ROOP, a citizen of the United States, residing at Louisville, in the county of Jefferson and State of Kentucky, have invented certain new and useful Improvements in Moving-Picture Cameras and Projecting Devices, of which the following is a specification.

My invention relates to moving picture devices and particularly to cameras adapted for taking a large number of exposures in rapid succession.

More specifically my invention relates to a camera of the class mentioned which may be also used as a projecting device.

The object of my invention is to provide a camera for the purpose stated which shall be of such small dimensions and of such simple operation that it shall constitute a hand camera and be operated with the same facility as the ordinary kodak.

A further object of my invention is to provide a camera of the class under consideration equipped with a spring motor for operating the same and also with means for manually operating the device, and of such construction that said means may be used interchangeably at the will of the operator without adjustment of any of the parts and without interfering one with the other.

My invention has as a further object to provide improved film and shutter actuating mechanism.

A further object of my invention is to provide a camera of the class mentioned which may be readily and quickly adjusted or arranged to constitute a projecting apparatus.

Other objects will appear hereinafter.

With these objects in view my invention consists generally in the camera and projecting device, and the various details of construction and arrangements of parts hereinafter fully described and particularly pointed out in the claims.

My invention will be more readily understood by reference to the accompanying drawings, forming a part of this specification and in which—

Figure 1:
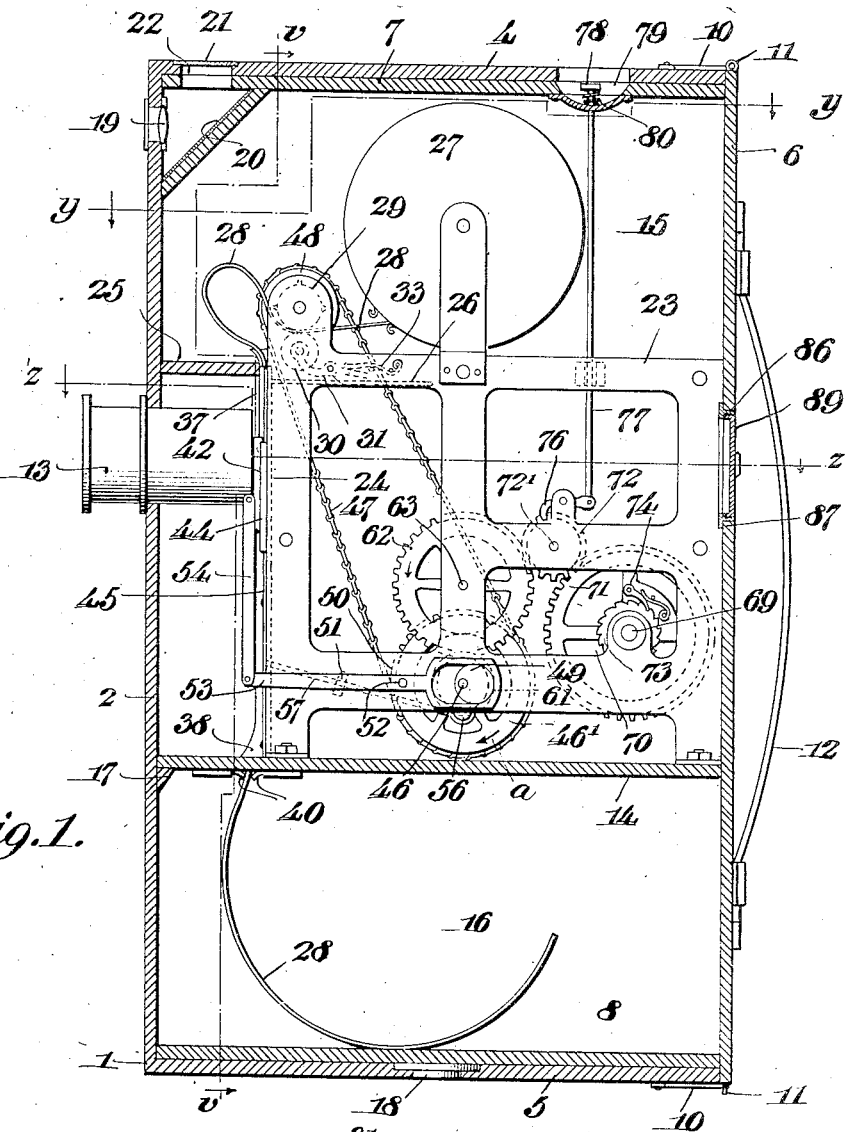
Figure 5:
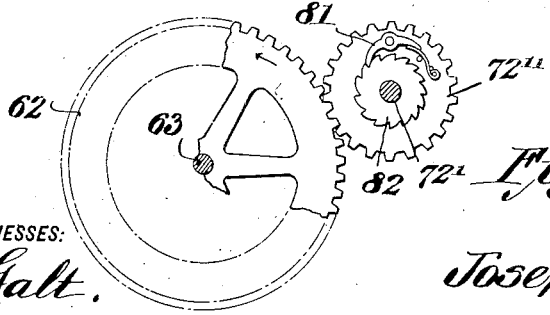

Figure 1 is a vertical longitudinal section through a device embodying my invention in its preferred form, the same being taken substantially on the line $x$—$x$ of Fig. 2, Fig. 2 is a horizontal section on the line $y$—$y$ of Fig. 1, Fig. 3 is a similar view taken on the line $z$—$z$ of Fig. 1, Fig. 4 is a detail section of the upper portion of the film feeding device and taken substantially on the line $w$—$w$ of Fig. 2, Fig. 5 is a detail view of a portion of the driving mechanism, Fig. 6 is a vertical transverse section on the line $v$—$v$ of Fig. 1, Fig. 7 is a perspective view illustrating the film moving and shutter actuating mechanism, Fig. 8 is a detail view illustrating a form of light emitting device adapted to be arranged upon the camera when the same is to be used as a projecting device, and Fig. 9 is a detail sectional view on substantially the line T—T of Fig. 3.

Referring now to the drawings 1 indicates a light tight camera box formed of two telescopic sections. One section comprises the front 2, sides 3, top 4 and bottom 5. The other section comprises a back 6, a top portion 7 and bottom portion 8, which fit against the inner faces of the top and bottom members 4 and 5 respectively and side members 9 which fit snugly against the inner faces of the sides 3. To secure the sections together, hooks 10 are provided on the sides 3 which engage eyes 11 on the back 6.

12 indicates a handle provided, preferably on the back, for carrying the device; and secured in the front 2 is a lens barrel 13. The back section of the box is provided with a horizontal partition 14 that divides the box into an upper mechanism chamber 15 and a lower chamber 16 to receive the exposed film. The partition 14 is secured to the back 6 and sides 9 of the rear section in a light tight manner and the forward edge rests upon a strip 17 fixed to the front 2, by which arrangement light is prevented from entering the chamber 16.

18 indicates a bushing which may be provided in the bottom of the device to receive the tripod screw.

A view finder is provided in the upper forward portion of the box. This comprises a lens 19 fixed in the front 2, a reflector 20 secured to the top 7 of the back section and a lens or ground glass 21 arranged above the same either in the member 4 or 7 as preferred, said members being provided with registering apertures 22 directly above the reflector 20. I prefer to arrange the lens or glass 21 in the outer section 4 as by this construction dust is excluded from the box which otherwise might work its way between the members 4 and 7 and past the end of the latter into the interior of the device.

Arranged upon the partition 14, and preferably secured thereto, is the frame 23 carrying the mechanism hereinafter described. At the front of the frame 23 is a plate 24 extending upwardly from the partition 14 to substantially the top of the frame, and secured to the front 2 above the lens barrel 13 is a horizontal member 25 that abuts the plate 24 when the box sections are telescoped. By this arrangement light is excluded from the upper forward portion of the box, and if preferred, a plate 26 may be arranged horizontally in the upper portion of the frame 23, extending rearwardly from the plate 24 to insure perfect exclusion of light from the film as will appear more clearly hereinafter.

27 indicates a cylindrical box containing the unexposed film, which box is removably arranged in the upper portion of the camera box 1 above the partitions 25 and 26. The film 28 passes from the box 27 to the feed rollers 29 and 30, the roller 29 being mounted in fixed bearings and the roller 30 upon a spring pressed spindle 31 to facilitate arranging the film between them.

32 indicates a pivoted arm upon which the spindle 31 is mounted and 33 a spring bearing upon the same for holding the roller 30 in yielding engagement with the roller 29. The roller 29 is provided with the usual projections or pins 34 for engagement with the apertures 35 in the film and the roller 30 with the peripheral grooves 36 to accommodate the same.

The portion of the device just described is arranged entirely above the horizontal partitions 25 and 26 so that there is no danger of the film being light struck as it is fed from the box 27.

Secured to the front of the plate 24 is a channel member 37 extending from a point above the partition 25 to the partition 14 and forming with the plate 24 a passage way of sufficient cross section to accommodate the film and constituting a guide for the same from the feed rollers 29 and 30 to the compartment 16. The lower end of the member 37 is flared as at 38, and an aperture 39 is formed in the partition 14 directly beneath said flared end. To prevent the possibility of light entering the compartment 16 through the aperture 39 felt strips 40 are provided which impinge against the sides of the film strip. Directly behind the lens barrel an aperture 41 is provided in the member 37 and a reciprocating shutter 42 is arranged between said barrel and said member. The shutter is shaped in horizontal cross section to fit snugly the member 37 and is provided with vertically disposed lateral base flanges 43 arranged in guides 44 formed by turning back a portion of the base flanges 45 of the member 37. The rollers 29 and 30, that feed the film continuously from the box 27, and mechanism, to be described hereinafter, for feeding the film intermittently past the aperture 41, together with the shutter, are operated simultaneously from one shaft.

46 indicates the main shaft rotatably mounted in the lower portion of the frame 23 and provided at one end with a sprocket gear 46' connected by a chain 47 to a similar gear 48 on the spindle of the roller 29. The opposite end of the shaft 46 is provided with an eccentric 49 which engages in the slotted arm 50 of a lever 51 pivotally mounted as at 52 upon the side of the frame 23. The opposite arm 53 of said lever is connected by a link 54 to the shutter 42. It is obvious that as the shaft 46 rotates in the direction of the arrow $a$, the eccentric 49 will operate the lever 51 to raise and lower the shutter. The shaft 46 is provided intermediate its ends with a crank 56 to which are connected a pair of rods or fingers 57 the ends of which are adapted to engage in the perforations 35 of the film and move the film intermittently through the channel member 37. The fingers 57 extend through apertures 58 in an oscillating bar 59. The plate 24 and member 37 are slotted as at 60 to receive the ends of the fingers 57 when they are projected forwardly into engagement with the film. The operation of this portion of the device will be obvious by referring to Figs. 1, 6 and 7.

The shaft 46 may be driven either manually or by means of a spring motor. Fixed to the shaft 46 is a pinion 61 meshing with a gear 62 fixed to an arbor 63 mounted in the frame 23. One end of the arbor 63 extends into a small cylindrical housing 64 fixed to the inner face of the right hand wall 9 of the back section and is squared as at 65 to receive a crank 66 by means of which the device may be operated manually. The end of the arbor 63 terminates short of the plane of the outer face of the wall 9 so as not to interfere with the removal of the back section from the front section of the box 1. A felt disk 67 is preferably arranged in the bottom of the housing 64, closely surrounding the arbor 63 to prevent light from entering around the arbor. By referring to Fig. 9 it will be seen that the sides 3 and 9 are provided with registering apertures 68 to give access to the squared end 65.

69 indicates a second arbor mounted in the frame and provided with a spring 70 for driving the same. Loosely mounted on the arbor 69 is a gear 71 meshing with a pinion 72 fixed to a shaft 72'. The shaft 72' also carries a pinion 72'' which meshes with a gear 62. A ratchet wheel 73 is fixed to the arbor 69 and coöperates with a pawl 74 on the gear 71 in the usual manner to permit winding of the spring and driving of the gear 71 in one direction only. The end of the arbor 69 extends into a housing 64' similar in every respect to the housing 64 and has its end squared to receive a crank 75 for winding the spring 70.

76 indicates a pawl adapted to engage the teeth on the pinion 72 to act as a stop for the motor driven gearing. One end of the pawl is connected by a rod 77 to a push button 78 arranged in a depression 79 formed in the top of the box 1. When the spring motor is wound it is but necessary to press the button 78 to start the device in operation and releasing said button will immediately stop the device, the spring 80 being provided for returning the parts to normal position.

In order that the arbor 63 may be operated independently of the motor driven arbor, the pinion 72'' is loosely mounted on the shaft 72' and is connected by a pawl 81 to a ratchet wheel 82 fixed to said shaft. When the pawl 76 engages the pinion 72, the shaft 72' is held against movement, but the arbor 63 is free to turn in operative direction owing to the ratchet and pawl connection between the ratchet 82 and shaft 72. It will thus be seen that the manual and motor operating means may be used independently of each other without the necessity of adjustment or changing any of the parts. To control the speed of the mechanism when the spring motor is used a governor 83 is provided on the shaft 72' equipped with a friction disk 84 which, when the maximum speed is reached engages an arm 85 adjustably mounted in the side of the frame 23.

The device above described forms a complete and compact moving picture camera which may be made of such small dimensions as to adapt the same for use as a hand or pocket camera, but I further provide means whereby the same device may be employed as a projecting apparatus. To this end I provide the back 6 of the casing or box with an aperture 86 directly behind and in axial alinement with the lens barrel 13. Arranged in the aperture 86 is a bushing 87 which is internally threaded as at 88 to receive a plug or cap 89 for excluding the light when the device is used as a camera. When used as a projecting device the plug 89 is removed and a cylindrical shell 90 inserted in place of the same. The shell 90 is threaded at its inner open end as at 91 and is equipped with a condensing lens 92 and a source of light 93, preferably comprising an incandescent bulb as illustrated in Fig. 8. The shell 90 is preferably formed of two parts detachably connected at 94 to give access to the light 93. The bushing 87 is provided with an outwardly extending peripheral flange 95 and an inwardly extending peripheral flange 96, the latter forming a stop for the plug 89 or shell 90 and the two flanges serving to exclude light when the plug 89 is in position. It should be noted that the operative mechanism is arranged entirely below the lens barrel 13 and shell 90 with the exception of the feed rollers 29 and 30 so that there is nothing to interfere to the free passage of the light from said shell to the barrel 13.

Having described my invention what I claim as new and desire to secure by Letters Patent is:—

1. In a moving picture camera, a box comprising a front section consisting of a frontboard, top, bottom and sides and a back section comprising a backboard, top, bottom and sides adapted to telescope within the first mentioned top, bottom and sides, a lens barrel fixed to said front board, a substantially horizontal partition in said back section dividing said box into an upper mechanism chamber and a lower light tight chamber to receive the exposed film, means for feeding the film, a shutter and shutter operating mechanism, substantially as described.

2. In a moving picture camera, a box comprising front and rear telescopic sections, one of the said sections being provided with a horizontal partition dividing the box into upper and lower chambers, film feeding mechanism, a shutter and shutter operating mechanism arranged in the upper chamber, said partition being provided with an aperture to permit the exposed film to be fed into the lower chamber and light excluding means for said aperture, substantially as described.

3. In a moving picture camera, a box comprising a front section and a rear section adapted to telescope there into, a horizontal partition in said rear section adapted to divide said box into an upper chamber and a lower light tight chamber to receive an exposed film, a lens barrel fixed in the front section above said partition, film feeding mechanism, a shutter and shutter operating mechanism arranged above said partition and a rearwardly projecting partition arranged in said front section above said lens barrel, substantially as described.

4. In a device of the class described, a casing, a lens barrel arranged in the front of said casing, film feeding mechanism, a shutter and shutter operating mechanism, the rear wall of said casing being provided with an aperture in axial alinement with said lens barrel, a plug and a shell containing a source of light, said plug and said shell being adapted to be interchangeably arranged in said aperture, substantially as described.

In testimony whereof I have signed my name to this specification in the presence of two subscribing witnesses.

JOSEPH L. ROOP.

Witnesses:
JOSEPH ROOP,
HENRY ZOOTERER.